US011586485B2

(12) United States Patent
Laurenzio et al.

(10) Patent No.: US 11,586,485 B2
(45) Date of Patent: Feb. 21, 2023

(54) METHODS AND SYSTEMS FOR GENERATING NOTIFICATIONS

(71) Applicant: Shopify Inc., Ottawa (CA)

(72) Inventors: Paisley Laurenzio, Orleans (CA); Jordan Pollock, Ottawa (CA); Anna De Medeiros, Gatineau (CA); Emily Keefe, Ottawa (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 17/095,252

(22) Filed: Nov. 11, 2020

(65) Prior Publication Data
US 2022/0147406 A1    May 12, 2022

(51) Int. Cl.
| *G06F 9/54* | (2006.01) |
| *G06F 3/0481* | (2022.01) |
| *G06F 16/28* | (2019.01) |
| *G08B 5/22* | (2006.01) |
| *H04L 67/306* | (2022.01) |

(52) U.S. Cl.
CPC .......... *G06F 9/542* (2013.01); *G06F 3/0481* (2013.01); *G06F 16/285* (2019.01); *G08B 5/22* (2013.01); *H04L 67/306* (2013.01)

(58) Field of Classification Search
CPC ...... G06F 9/542; G06F 3/0481; G06F 16/285; G08B 5/22; H04L 67/306
See application file for complete search history.

(56) References Cited

U.S. PATENT DOCUMENTS

| 7,921,174 | B1 * | 4/2011 | Denise | G06Q 10/107 |
| | | | | 709/224 |
| 8,751,636 | B2 * | 6/2014 | Tseng | G06Q 50/01 |
| | | | | 709/224 |
| 9,571,446 | B2 * | 2/2017 | Cashmore | H04L 67/306 |
| 10,375,188 | B2 * | 8/2019 | Gutman | H04L 67/55 |
| 10,764,225 | B2 * | 9/2020 | Filip | H04L 51/52 |
| 2004/0204982 | A1 * | 10/2004 | Witting | G06Q 40/00 |
| | | | | 705/7.33 |

(Continued)

FOREIGN PATENT DOCUMENTS

EP    3343489 A1 *  7/2018

OTHER PUBLICATIONS

Abhinav Mehrotra and Mirco Musolesi, "Intelligent Notification Systems: A Survey of the State of the Art and Research Challenges", 1, 1, Article 1, published Jan. 2018, retrieved Dec. 1, 2022. (Year: 2018).*

*Primary Examiner* — Shourjo Dasgupta
(74) *Attorney, Agent, or Firm* — Ridout & Maybee LLP

(57) ABSTRACT

Methods and systems for generating notifications are described. A notification of a given notification type is provided in a manner defined according to a first notification category to which the given notification type is assigned. A user interaction associated with the notification is detected. A mismatch is identified between the user interaction and the first notification category. In response to identifying the mismatch, the given notification type is assigned to a second notification category that defines a second, different manner for providing a subsequent notification of the given notification type. The subsequent notification of the given notification type is provided according to the second notification category.

20 Claims, 8 Drawing Sheets

(56) References Cited

U.S. PATENT DOCUMENTS

| | | | |
|---|---|---|---|
| 2010/0211456 A1* | 8/2010 | Reed | G06Q 30/0204 707/E17.014 |
| 2010/0250682 A1* | 9/2010 | Goldberg | H04L 51/34 709/206 |
| 2014/0278918 A1* | 9/2014 | Moran | G06T 1/0064 705/14.43 |
| 2014/0324537 A1* | 10/2014 | Gilbert | G06Q 10/06375 705/7.31 |
| 2014/0351713 A1* | 11/2014 | Hallerstrom Sjostedt | H04M 19/04 715/752 |
| 2015/0160635 A1* | 6/2015 | Schofield | G05B 11/01 700/90 |
| 2015/0294595 A1* | 10/2015 | Hu | G06Q 10/101 434/236 |
| 2016/0180383 A1* | 6/2016 | Rajab | G06Q 30/0255 705/14.53 |
| 2016/0343239 A1* | 11/2016 | Lamb | G08B 25/009 |
| 2016/0373513 A1* | 12/2016 | Kim | G06F 16/9577 |
| 2017/0316320 A1* | 11/2017 | Jamjoom | G06N 20/00 |
| 2018/0176331 A1* | 6/2018 | Jain | H04L 67/18 |
| 2018/0189895 A1* | 7/2018 | Le Bolzer | G08B 21/0476 |
| 2018/0219830 A1* | 8/2018 | O'Brien | H04L 51/48 |
| 2019/0018971 A1* | 1/2019 | Shmaya | H04L 12/22 |
| 2019/0097825 A1* | 3/2019 | Kan | H04L 12/1895 |
| 2020/0084171 A1* | 3/2020 | Gruhl | H04L 51/04 |
| 2020/0304460 A1* | 9/2020 | Mihara | H04L 67/306 |
| 2020/0328933 A1* | 10/2020 | Wu | H04W 4/38 |
| 2020/0372016 A1* | 11/2020 | Rogynskyy | G06Q 10/107 |
| 2021/0027180 A1* | 1/2021 | Glidden | G06Q 30/016 |
| 2021/0029064 A1* | 1/2021 | Higgins | G06Q 10/06393 |
| 2021/0044698 A1* | 2/2021 | Thalange | G06Q 10/063112 |
| 2021/0044699 A1* | 2/2021 | Thalange | G06Q 30/016 |
| 2021/0201175 A1* | 7/2021 | Ou | G06N 5/04 |
| 2021/0243150 A1* | 8/2021 | Vasamsetti | H04L 63/20 |

* cited by examiner

FIG. 5

E-Commerce Platform  🔍 Search

- 🏠 Home
- 📥 Orders (652)
- 🏷 Products
- 👥 Customers
- 📊 Reports
- 🎟 Discounts
- ▦ Apps

SALES CHANNELS ⊕
- 🖥 Online Store
- 📱 Mobile App
- ◇ View all channels

⚙ Settings

470 / 472 / 474 / 476

JG  John's Apparel
     Jonny B. Good

Good afternoon, Jonny B.
Here's what's happening with your store today.

Today's total sales    Today's visits
$98.00                 1

○ Update your Platform Payments tax details
   We require additional information to verify your identity.
   [Update tax details]

○ Advanced Cash on Delivery has been deactivated for your store
   [See why]

All channels ▾                    Today ▾

TOTAL SALES                       Jun 1
$98.00                            2 orders $125
$75
$25
    12am    4am    8am    11am TOTAL SALES BY CHANNEL    June 1

Online Store              View dashboard
$0.00                     0 orders

Mobile App
$0.00                     0 orders

POS
$0.00                     0 orders

METHODS AND SYSTEMS FOR GENERATING NOTIFICATIONS

FIELD

The present disclosure is related to generation of notifications on a software platform. In particular, the present disclosure relates to methods and systems for automatic re-categorization of a notification definition, based on user response to notifications generated from the definition.

BACKGROUND

On a software platform (e.g., an e-commerce platform), software applications registered on the platform may generate notifications that are presented to a user via the platform. Each application may define its own types of notification. A notification definition may define parameters for how a given type of notification is generated to each user. For example, a notification definition may define the information included in the given type of notification, the channel of communication used to provide the given type of notification, whether there is any selectable option included in the given type of notification, and so forth.

Each type of notification can be categorized into various categories with different action/priority levels such as announcements, secondary alert, insights, requirement, etc. It should be noted that the notification categories need not be in a strict hierarchy—for example, two notification categories may have the same priority—but all notification types belonging to the same category share some common parameters, such as having the same persistence, the same channel of communication, and/or the same action requirement level.

Conventionally, a software developer typically sets the notification category for each type of notification generated by an application (and provided to users via the software platform). The developer may set the notification category based on a common definition of the categories, however individual interpretations might not be appropriate for all users on the platform. A developer may also misclassify a notification type, for example due to unintentional misinterpretation of the category definition, or intentionally to promote an application's notifications ahead of notifications from other applications. Further, when there are different users with different levels of authorization and/or different roles using the platform, a given type of notification might only be relevant/actionable by some users and not by others. The result is that users find notifications un-useful and annoying, and truly important notifications can be overlooked.

SUMMARY

In various examples, the present disclosure describes methods and systems that enable a software platform to automatically manage how a type of notification defined by a software application is categorized on the platform. Based on how users using the software platform respond to notifications generated for a certain notification type, the platform may automatically re-categorize the notification type.

Further, in some examples, a given notification type may be categorized differently for different user groups (e.g., in response to how individual users in the different user groups respond to notifications generated for the given notification type).

Accordingly, examples described herein may enable a more context-aware categorization of notification types to be provided, which may be more user-friendly and result in better usage of communication resources.

In some examples, the present disclosure describes a system including a processor in communication with storage. The processor is configured to execute instructions from the storage to cause the system to: provide a notification of a given notification type according to a first notification category to which the given notification type is assigned, the first notification category defining a manner in which the notification is provided; detect a user interaction associated with the notification; identify a mismatch between the user interaction and the assigned first notification category; in response to identifying the mismatch, assign the given notification type to a second notification category, the second notification category defining a second, different manner for providing a subsequent notification of the given notification type; and provide the subsequent notification of the given notification type according to the second notification category.

In some examples, the present disclosure describes a method for generating notifications. The method includes: providing a notification of a given notification type according to a first notification category to which the given notification type is assigned, the first notification category defining a manner in which the notification is provided; detecting a user interaction associated with the notification; identifying a mismatch between the user interaction and the assigned first notification category; in response to identifying the mismatch, assigning the given notification type to a second notification category, the second notification category defining a second, different manner for providing a subsequent notification of the given notification type; and providing the subsequent notification of the given notification type according to the second notification category.

In any of the examples, the first notification category and the second notification category may each define one or more parameters for generating the notification, and the second notification category may define at least one parameter for generating the subsequent notification that is different from the one or more parameters defined by the first notification category.

In any of the examples, the one or more parameters defined by the first or the second notification category may include one or more of: a communication channel for presenting notifications of the given notification type; an urgency level associated with the notification type; a format for presenting notifications of the given notification type; a time duration associated with notifications of the given notification type; or a requirement level for performing a workflow associated with the notification type.

In any of the examples, the user interaction may be one or more of: a user-activated workflow associated with the notification type; an option selection presented by the notification; a notification view event; an absence of a response event; or a notification dismiss event.

In any of the examples, the user interaction may include the user-activated workflow associated with the notification type. The processor may be configured to execute instructions from the storage to cause the system to, or the method may also include: collect data associated with the platform for a time duration subsequent to execution of the user-activate workflow; and assign the notification type to the second notification category after determining, from the collected data, a success metric associated with execution of the user-activated workflow and the success metric meets a defined success criteria.

In any of the examples, the detected user interaction may be associated with a user group, and the notification type may be assigned to the second notification category for the user group. The processor may be configured to execute instructions from the storage to cause the system to, or the method may also include: generate, for a user account belonging to the user group, the subsequent notification according to the second notification category.

In any of the examples, the detected user interaction may be associated with a user group, and the notification type may be assigned to the second notification category for the user group. The processor may be configured to execute instructions from the storage to cause the system to, or the method may also include: generate, for a user account excluded from the user group, a different subsequent notification according to the first notification category.

In any of the examples, the user group may be defined by one or more of: association with a service instance supported by the platform; status associated with a user; hierarchy level associated with a user; or one or more user characteristics.

In any of the examples, the detected user interaction may be associated with a superuser of a user group, and the notification may be assigned to the second notification category for other users in the user group based on the detected user interaction associated with the superuser.

In some examples, the present disclosure describes a computer-readable medium storing instructions that, when executed by a processor of a system, cause the system to: provide a notification of a given notification type according to a first notification category to which the given notification type is assigned, the first notification category defining a manner in which the notification is provided; detect a user interaction associated with the notification; identify a mismatch between the user interaction and the assigned first notification category; in response to identifying the mismatch, assign the given notification type to a second notification category, the second notification category defining a second, different manner for providing a subsequent notification of the given notification type; and provide the subsequent notification of the given notification type according to the second notification category.

The instructions, when executed by the processor, may cause the system to perform any of the methods described herein.

BRIEF DESCRIPTION OF THE DRAWINGS

Reference will now be made, by way of example, to the accompanying drawings which show example embodiments of the present application, and in which:

FIG. 5 is an example homepage of an administrator, which may be accessed via the e-commerce platform of FIG. 4;

Similar reference numerals may have been used in different figures to denote similar components.

DESCRIPTION OF EXAMPLE EMBODIMENTS

Figure 1:
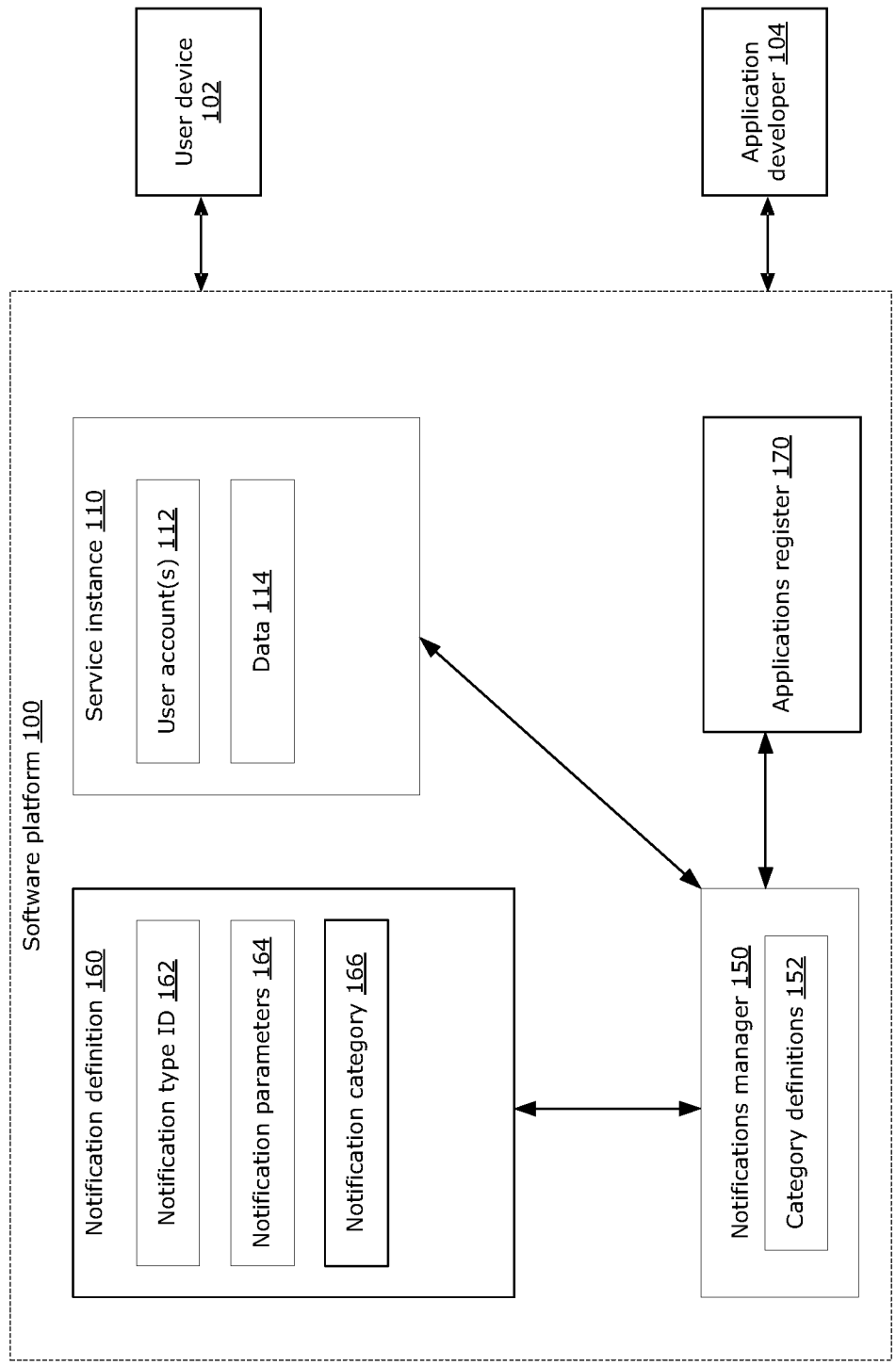
FIG. 1 is a block diagram of an example software platform, in which examples described herein may be implemented.

FIG. 1 is a block diagram illustrating an example software platform 100, in which examples disclosed herein may be implemented. Notably, however the example software platform 100 is only an example of an environment in which the subject matter of the present application may be applied. For example, the subject matter of the present application could be applied in relation to other software platforms or, more broadly, as a component of other computerized systems.

The example software platform 100 will now be described in relation to FIG. 1. In the context of the present disclosure, the software platform 100 may be defined as an environment (e.g., providing processor resources, memory, etc.) on which software applications can be executed. The software platform 100 is implemented using hardware resources, for example using one or more physical machines (e.g., server(s)). The software platform 100 may be implemented in a distributed manner, using resources provided by a group of physical machines.

In some examples, the software platform 100 may be used by multiple users (also referred to as clients of the software platform 100). For example, the software platform 100 may be an online platform that is accessible (e.g., using a user device 102) via an online portal. In some examples, the software platform 100 may host multiple service instances 110 each service instance 110 being a set of functionality provided by the software platform 100. Each service instance 110 may be associated with one or more user accounts 112, and may be associated with a set of data 114. In some examples, the software platform 100 may be an extensible software as a service (SaaS) platform. In some examples, the software platform 100 may be an e-commerce platform, each service instance 110 may be an online store supported by the software platform 100, and the data 114 associated with a service instance 110 may include data (e.g., sales data, marketing data, inventor data, customer data, etc.) related to operation of the online store. In other examples, the software platform 100 may not support service instances 110.

Software applications may be registered to run on the software platform 100. Software applications running on the software platform 100 may include first-party applications (i.e., applications developed by the operator of the software platform 100) and/or third-party applications (i.e., applications developed by a third-party developer 104 outside of the software platform 100). A software application running on the software platform 100 may use resources (e.g., memory, processor resources, etc.) provided by the software platform 100 in order to provide functionality to users of the software platform 100. In the example shown, the software platform 100 includes an applications register 170 on which software applications running on the software platform 100 are registered using a respective application identifier (ID). In some examples, the application register 170 may also include an indication of which users or service instances 102 have installed which application, or are using functionalities provided by which application.

Each application registered on the software platform 100 may generate notifications to be presented to users over the software platform 100 (e.g., via an online portal accessed by the user device 102). As will be discussed further below, generation of notifications may be managed by the software platform 100 using a notifications manager 150.

Notifications are generated according to a notification type that is defined by a respective notification definition 160. Notifications may be generated to multiple different users and/or to the same user at multiple different times according to a given notification type. In other words, in at least some implementations, the notification type may be thought of as identifying a template for generating notifications, that template being defined by the corresponding notification definition 160. The notification definition 160 may include, for example, a notification type ID 162, notification parameters 164 and a notification category 166 associated with the defined notification type. Notification parameters 164 may define, for example, text information to be presented by the notification, selectable option(s) presented by the notifications, event(s) that trigger generation of the notification, etc.

Each notification type defined by a notification definition 160 is assigned to at least one notification category 166. As will be discussed further below, a given notification type may be assigned to different notification categories 166 for providing notifications to different user groups and/or over different communication channels. Accordingly, the notification definition 160 for a given notification type may include multiple notification categories 166, each notification category 166 being specified for a respective user group and/or communication channel.

Different notification categories may be defined by the software platform 100, and stored as category definitions 152 in the notifications manager 150. The category definitions 152 define, for each notification category, a respective set of one or more parameters for generating a notification in that category. Generally, each notification category differs from other notification categories in at least one parameter. Parameters defined by a notification category may include, for example, one or more of the communication channel (e.g., via email, pop-up, info bar on dashboard, etc.) to be used for presenting a notification, an urgency level associated with a notification, a persistence or time duration for presenting the notification (e.g., display each time user logs in to the software platform 100, display only once, display until timeout, etc.), a requirement level for taking an action associated with the notification (e.g., no action required, optional action, mandatory action, etc.), among others. Some possible notification categories include, for example, announcements (e.g., low priority, no action required), secondary alert (e.g., information with timeout, no action required), information (e.g., lower priority, user-specific information, optional action), insights (e.g., recommended action, optional action or can be dismissed), required tasks (e.g., high priority, action required, highly persistent), etc.

The category definitions 152 may also define, for each notification category, expected user interaction patterns or expected user interaction statistics. For example, a higher priority notification category (e.g., a required task) may be associated with an expected high percentage of positive user interactions (e.g., it is expected that a large majority of users would act on the notification), whereas a lower priority notification category (e.g., an announcement) may be associated with an expected lower percentage of positive user interactions (e.g., it is expected that a large majority of users would dismiss the notification without taking further action).

Notification types assigned to the same notification category will have notifications generated according to the same category-defined parameters (in addition to the notification parameters 164 specified in the notification definition 160 for each notification type).

At least a portion of the information contained in the notification definition 160 may be defined by the application developer 104. For example, the application developer 104 may define notification parameters 164. Other information in the notification definition 160 may be set by the software platform 100. For example, the software platform 100 may assign a notification type ID 162 to enable the notification type to be uniquely identified on the software platform 100. As will be discussed further below, the software platform 100 may set the notification category 166 that is assigned to a given notification type (and optionally for a specific user group and/or communication channel), and may override or change a previous notification category 166 that was assigned to the notification type (e.g., that was originally assigned by the application developer 104, or that was previously assigned by the software platform 100).

In some examples, assigning a given notification type to a particular notification category 166 may also override or change a previously set notification parameter 164. For example, the format or visual look that is originally defined in the notification parameters 164 by the application developer 104 may be overridden if the assigned notification category 166 defines a different format or visual look (e.g., changes the text color or adds a colored border to emphasize urgency in the case of a higher priority notification category 166).

Details of how notifications are generated and how notification types are assigned to different notification categories by the notifications manager 150 will be discussed further below.

Figure 2:
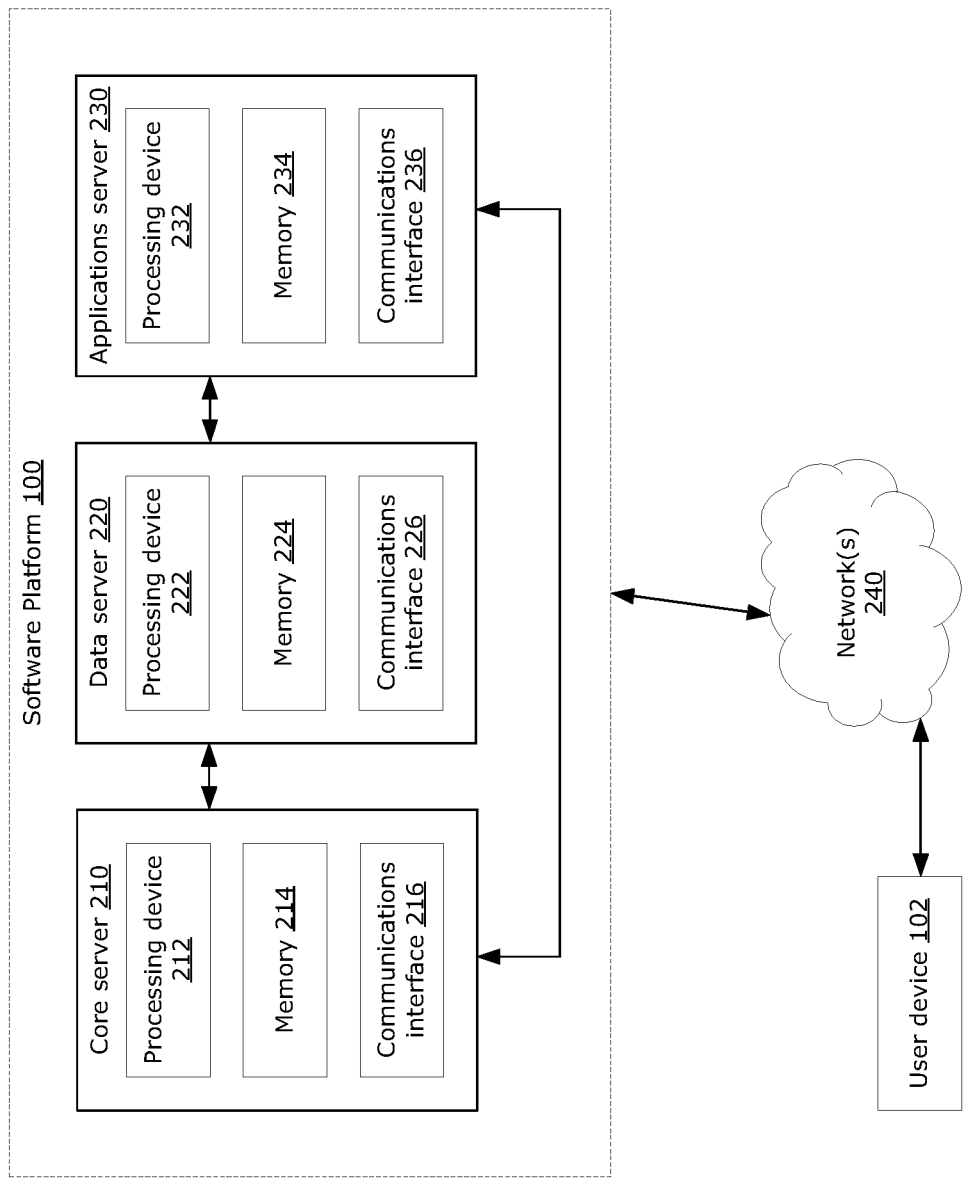
FIG. 2 is a block diagram illustrating an example implementation of the software platform of FIG. 1.

FIG. 2 is a block diagram of an example hardware configuration of the software platform 100. In this example, the software platform 100 is implemented using a computer system comprising a group of servers 210, 220, 230. However, in other examples the software platform 100 may be implemented using a single machine (e.g., a single server, a single desktop computing system, etc.) or may be implemented using some other combination of computing devices such as, for example, a virtual machine that has access to a pool of resources pooled from multiple physical machines. It should be noted that different components of the software platform 100 may be implemented in separate hardware or software components, on a common hardware component or server or configured as a common (integrated) service or engine in the e-commerce platform 100. Although FIG. 2 illustrates an example hardware implementation of the software platform 100, it should be understood that other implementations may be possible and alternative computing devices and/or systems may be employed. For example, there may be greater or fewer numbers of servers, the e-commerce platform 100 may be implemented in a distributed manner, or at least some of the memories may be replaced with external storage or cloud-based storage, among other possible modifications.

In the example of FIG. 2, the software platform 100 includes a core server 210, a data server 220 and an applications server 230, which are each in communication with each other (e.g., via wired connections and/or via wireless intranet connections). Each of the servers 210, 220, 230 include a respective processing device 212, 222, 232 (each of which may be, for example, a microprocessor, graphical processing unit, digital signal processor or other computational element), a respective memory 214, 224, 234 (each of which may be, for example, random access memory (RAM), read only memory (ROM), hard disk, optical disc, subscriber identity module (SIM) card, memory stick, secure digital (SD) memory card, and the like, and may include tangible or transient memory), and a respective communications interface 216, 226, 236 (each of which may include transmitter, receiver and/or transceiver for wired and/or wireless communications). The core server 210 may store instructions and perform operations relevant to core capabilities of the software platform 100, such as providing administrative functions, maintaining service instances 110, or providing the functions of the notifications manager 150, among others. The data server 220 may be used to maintain data residing on the software platform 100, such as information about user accounts 112 and/or data 114 associated with service instances 110. The applications server 230 may store instructions and perform operations relevant to applications running on the software platform 100, and may include maintaining the applications register 170.

Users may, using a user device 102, access the software platform 100 via one or more networks 240 (e.g., wired and/or wireless networks, including a virtual private network (VPN), the Internet, and the like).

As described previously, an application running on the software platform 100 may cause a notification to be generated for a notification type, in accordance with the notification definition for that notification type. The generated notification is provided to a user (e.g., presented via the user device 102) and the software platform 100 can monitor for the user's response (if any) to the notification. The software platform 100, in examples described herein, has oversight to control how generated notifications are presented to a user. As will be explained below, the software platform 100 may assign a notification category to the notification type, based on the monitored user response to notifications belonging to the notification type.

In examples where there are multiple users on the software platform 100, interactions by different users with notifications generated for a given notification type can be detected by the software platform 100. Over multiple user interactions, aggregated and/or statistical information can be identified (e.g., most users dismiss the notification without any action). Based on the user interactions, it can be determined whether there is a mismatch between the notification category 166 currently assigned to a given notification type (e.g., as indicated in the notification definition 160 for the given notification type), and if so a different notification category can be automatically assigned to better match the user interactions (e.g., a notification type may be re-classified to a lower priority notification category if notifications for this notification type are dismissed by most users without any action).

Figure 3:
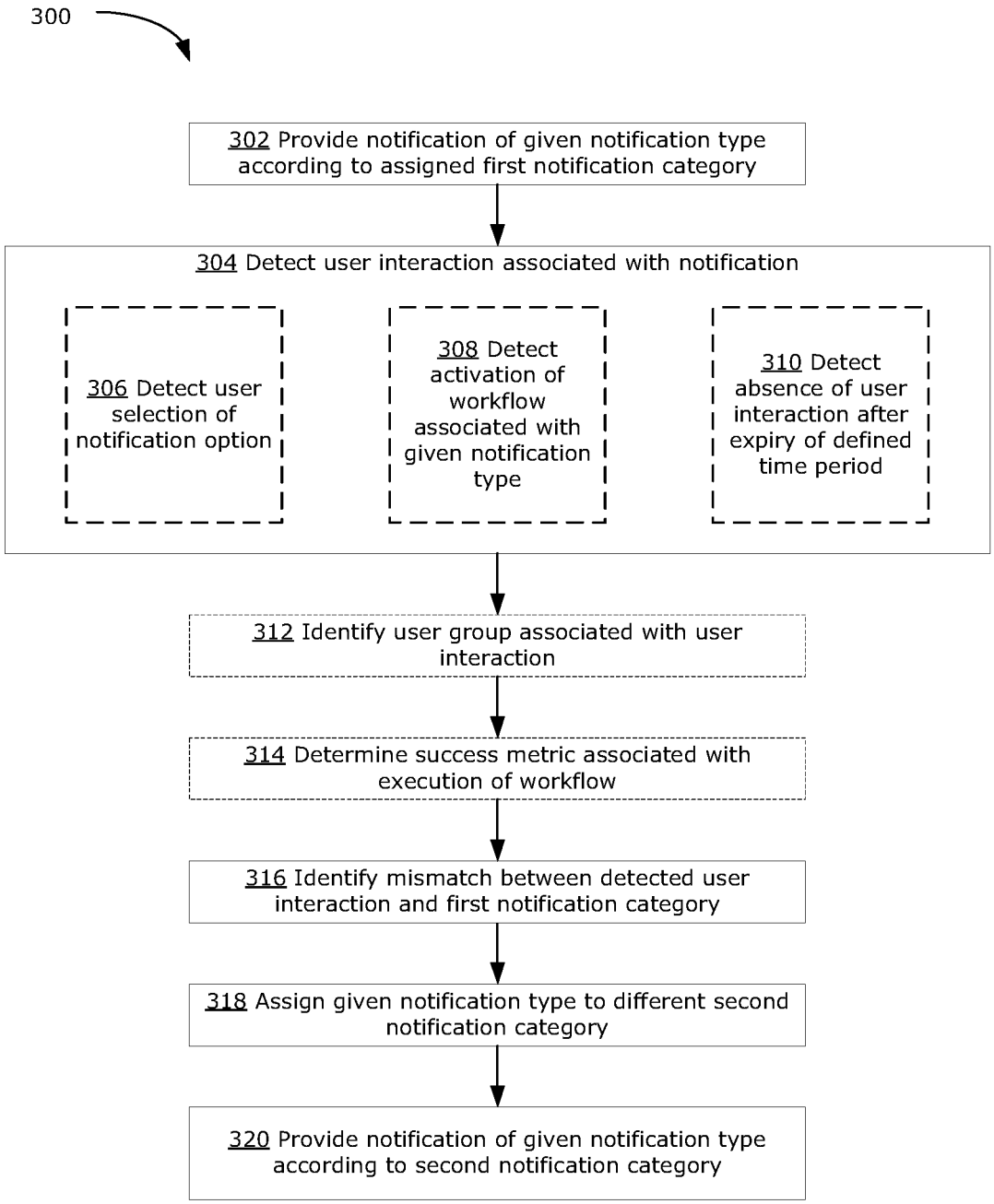
FIG. 3 is a flowchart illustrating an example method for generating notifications.

FIG. 3 is a flowchart illustrating an example method 300 for generating notifications. The example method 300 may be performed by the software platform 100 using the notifications manager 150, for example.

At an operation 302, a notification of a given notification type is provided to a user (e.g., via a user device 102 associated with the user). The notification is generated and presented according to the notification definition 160 for the given notification type, and in particular according to a first notification category 166 assigned to the notification type.

The first notification category 166 may be a notification category that is originally assigned to the given notification type by the application developer 104 (e.g., where the notification type is newly designed and the associated notification definition 160 is newly added to the software platform 100). The first notification category 166 may also be a notification category that was previously assigned by the notifications manager 150 (e.g., by performing the method 300). In some examples, the first notification category 166 may be some default category that is assigned to the notification type in absence of any explicit notification category 166 being included in the notification definition 160 (e.g., if the application developer 104 did not specify the notification category 166).

In other words, the method 300 may be used to automatically categorize or re-categorize the given notification type, whether the original notification category was assigned by the application developer 104, assigned by the software platform 100, previously assigned by the notifications manager 150, or unassigned. The method 300 may be performed repeatedly (e.g., on a periodic basis) for the same given notification type, so that the notification category assigned to the given notification type may be updated from time-to-time (e.g., periodically) to reflect the most recent user interactions with notifications of the given notification type.

At an operation 304, user interaction associated with the generated notification is detected. The user interaction may be monitored over a defined period of time (e.g., a day) to collect data about how users interact with notifications of the given notification type, when presented according to the first notification category. As depicted in FIG. 3 through the use of stippled lines, one or more optional operations may be employed, alone or in combination, in order to detect a user interaction associated with the notification. More particularly, as shown in FIG. 3, the user interaction may be detected at the operation 304 such as, for example, by employing one or more of the operations 306, 308 and/or 310 further described below.

For example, at operation 306, user selection of an option presented by the notification may be detected. In a particular example, an indication of input corresponding to a user selection of such an option may be received. The option may be selected from amongst one or more selected options presented in association with the notification. For example, the notification may present one or more selectable options, such as an "accept" option, a "reject" option, a "view more" option, a "dismiss" option, etc. Selection of a particular option may be considered to be a positive or negative (or in some cases neutral) user interaction. For example, selection of the "accept" or "view more" options may be detected as a positive user interaction, whereas selection of the "reject" or "dismiss" options may be detected as a negative user interaction.

In another example, at an operation 308, if there is a workflow associated with the notification type (e.g., as defined in the notification parameters 164 of the notification definition 160 for the notification type), the software platform 100 may detect whether the workflow has been activated. Notably, user activation of the associated workflow does not necessarily require the user to select an option presented by the notification or otherwise indicate that the user is responding to the notification. The notifications manager 150 may detect that, after the notification was presented to the user (e.g., within a defined time period, for example within the same user session on the software platform 100), there is a change or update to the data 114 associated with a service instance 110 accessed by a user, or a change or update to the user account 112 associated with the user. If the change or update reflects activation of the workflow associated with the notification type, then the notifications manager 150 may detect this as a positive user interaction that is associated with the notification.

For example, consider a notification type that is an announcement or recommendation to update contact information in the user account 112. The workflow associated with this notification type may be viewing the contact information and optionally changing the contact information (e.g., by way of a suitable user interface). A notification of this notification type may be presented to a user (e.g., displayed in a status bar on a webpage viewable using the user device 102). The notification may include a selectable option to directly link to the administration page to update the contact information. The user does not select the option and may dismiss the notification without action, but later (e.g., within the same user session) updates contact information in the user account 112. The notifications manager 150 detects this update to the user account 112 as activation of the workflow associated with the notification type. Thus, the notifications manager 150 detects the update as a user interaction that is associated with the notification generated for the notification type, even though the user did not select any option presented by the notification (and may have even dismissed the notification). This is only a simple example, and it should be understood that more complex workflows may be similarly detected and attributed as a positive user response to a notification.

In another example, at an operation 310, the notifications manager 150 may detect an absence of user interaction associated with the notification. An absence of user interaction may be detected if, after expiry of a defined time period (e.g., within a single user session, within a day, or after timeout of some persistence period defined in the notification definition 160), none of 306 or 308 has been detected. Absence of user interaction may be considered to be a negative response to the notification, which may be equivalent to an explicit user dismissal of the notification, or an explicit user selection of a reject option presented by the notification. That is, non-interaction may be considered to be a negative user interaction. In some examples, absence of user interaction may be considered a neutral response or neural interaction.

Example operations 306, 308, 310 illustrate some techniques by which the notifications manager 150 may detect a user interaction associated with the notification. The operations 306, 308, 310 may be performed separately or in any combination. It should be understood that other techniques may be used, in addition to or instead of the operations 306, 308, 310. For example, viewing the notification may be detected as a user interaction (e.g., a positive user interaction). This may be the case where a user is first alerted (e.g., via a preview or the notification or a "new notice" alert presented on the user device 102) to the presence of the notification and the user takes further action (e.g., click on a link or navigate to a webpage) to view the notification. In other examples, the notification may be presented to be fully viewable by default (e.g., presented in full on a user's home page), and simply viewing the notification may not be considered a user interaction.

However the operation 304 is implemented, following the operation 304, an optional operation 312 may be next.

Optionally, at operation 312, a user group is identified and associated with the user interaction. The user group may be identified based on information contained in a user account or user profile associated with the user to whom the notification was presented. For example, if the user is associated with a user account 112 belonging to a specific service instance 110, the detected user interaction at the operation 304 may be associated with a user group defined for the service instance 110. In another example, if the user is associated with a user account 112 that has been assigned a hierarchy level (e.g., a high-level operator or administrator of the service instance 110, a mid-level manager of the service instance 110, or a low-level user of the service instance 110), the detected user interaction at the operation 304 may be associated with a user group defined for that particular hierarchy level. In another example, if the user profile associated with the user indicates a particular user status on the software platform 100 (e.g., new user on the software platform 100, high priority user, etc.), the detected user interaction at the operation 304 may be associated with a user group defined for that particular user status. In another example, if the user profile associated with the user indicates a particular user characteristic (e.g., age bracket, geographic region, etc.), the detected user interaction at the operation 304 may be associated with a user group defined for that particular user characteristic.

Other such user groups may be defined and associated with the detected user interaction. It should be noted that the user interaction may be associated with multiple user groups (e.g., if a user is associated with a specific service instance 110 and also has a specific user status on the software platform 100), and user groups may be defined by multiple criteria (e.g., a user group may be defined for a specific service instance 110, and a specific hierarchy level within that service instance 110).

By associating the detected user interaction with a user group, the notifications manager 150 may enable the given notification type to be assigned different notification categories for different specific user groups. For example, users that are experienced or expert users on the software platform 100 may have negative user interaction (e.g., dismiss) with a notification type that announces shortcuts on the software platform 100 (e.g., such users may be familiar with the software platform 100 already and already know such shortcuts), whereas users that are new to the software platform 100 may have positive user interaction (e.g., select "view more" option, or activate the announced shortcut) with this notification type (e.g., such users may not know about the shortcut). In examples where a service instance 110 is an online store, a user group may be defined as all employee users associated with the online store, or different user groups may be defined by a user's employment with the online store (e.g., owner, manager, retail employee, sales representative, etc.). For example, a retail employee may not have authority to act on notifications related to inventory management and thus may always dismiss inventory-related notifications, whereas an owner or manager may always click on such notifications to act on inventory management immediately. The ability to associate the detected user interaction with a user group may enable the notifications manager 150 to better customize the generation and presentation of notifications to each user.

Optionally, at an operation 314, if there is a workflow associated with the notification type (e.g., as indicated by the notification definition 160) and the workflow has been executed, a success metric for executing the workflow may be determined. After the workflow has been executed, the notifications manager 150 may check whether the user interaction led to successful results. For example, if the user activated the workflow associated with the given notification type, but execution of the workflow did not lead to successful results, the overall user interaction may be considered to be a negative interaction. On the other hand, if the workflow led to successful results, the overall user interaction may be considered to be very positive.

To determine whether a user-activated workflow led to a successful result or not, a defined success metric is evaluated using data collected by the software platform 100. The defined success metric may be associated with the particular workflow (e.g., indicated in the notification definition 160 for the given notification type), may be a general success metric that is not tied to any particular workflow, or may be a combination of one or more such specific (associated with the particular workflow) or general success metrics. An example of a general measure of success could, for example, be whether a user is accessing a help function or a support page at a lower rate after activating the workflow. In examples where a service instance 110 on the software platform 100 is an online store, a general success metric may be whether the online store experiences increased sales or increased page views over the following defined time period (e.g., the next month) after activating the workflow.

In some examples, the success metric may be applied to the detected user interaction to weight the user interaction as being more positive or more negative than that detected at operation 304. The ability for the software platform 100 to evaluate the success of executing a workflow associated with the notification type enables more nuanced categorization of notifications, which may help to improve the user experience on the software platform 100, and may help to ensure that notifications lead to a more efficient use of resources on the software platform 100.

At an operation 316, a mismatch between the detected user interaction and the first notification category assigned to the given notification type is identified. For example, over a period of time data about user interactions by multiple users on the software platform 100 may be collected and analyzed to determine user interaction statistics. The analysis may be relatively simple (e.g., statistics of user interactions that are positive, negative or neutral) or may include more detailed analysis (e.g., amount of time between viewing the notification and activating the workflow associated with the notification type). Where a success metric has been used to weight the user interaction (e.g., at optional operation 314), this weighting may be taken into account when performing the analysis. The analysis may also be related to the notification parameters 164 defined by the notification definition 160 for the given notification type. For example, if the notification parameters 164 define two different communication channels for presenting notifications of the given notification type, the analysis may determine user interaction statistics for each of the communication channels.

A mismatch may be identified if the detected user interaction has statistics or patterns that do not match the expected interaction statistics or pattern for the assigned first notification category (e.g., as defined by the category definition 152 for the first notification category). For example, a mismatch may be that the detected user interaction has a lower positive interaction rate than expected for the assigned first notification category, or a mismatch may be that the detected user interaction has a higher positive interaction rate than expected for the assigned first notification category. A mismatch may also be identified if the detected user interaction has statistics or patterns that are outliers (e.g., outside the standard deviation compared with the statistics or patterns of user interaction for other notification types in the first notification category). A mismatch may also be identified if the detected user interaction has statistics or patterns that is a better match with the interaction statistics or patterns detected in different notification category.

In examples where notifications of the given notification type are provided over different communication channels, there may be different user interaction statistics or patterns detected over the different communication channels, such that a mismatch may be identified when notifications are presented on a first communication channel, but no mismatch when notifications are presented on a second communication channel.

In some examples, the identification of a mismatch may be specific to a particular user group (e.g., if a user group was identified at optional operation 312), and there may be no mismatch identified for users outside of that particular user group.

In some examples, if a success metric was calculated at optional operation 314, the success metric may be taken into account in identifying a mismatch. For example, if the success metric was applied as a weighting factor for the detected user interaction, the success metric may be inherently taken into account when analyzing the user interaction. In another example, if the success metric was not used as a weighting factor, the success metric may be compared with a defined success criteria (e.g., a minimum success threshold, such as minimum increased sales of 5%). If the success metric does not meet the success criteria, the given notification type may not be assigned to a different second notification category despite a mismatch being identified, in an example. In another example, if the success metric does not meet the success criteria, the given notification type may be assigned to a different second notification category (e.g., assigned to a higher priority category), but if the success metric does meet the success criteria, the given notification type may be assigned to a different third notification category (e.g., assigned to an even higher priority category). Other such variations may be possible.

At an operation 318, after identifying a mismatch, the given notification type is assigned to a different second notification category. The notification category 166 indicated in the notification definition 160 for the given notification type is updated to reflect the different second notification category.

The second notification category defines (e.g., as indicated in the category definitions 152) a different manner for providing notifications than the first notification category. The second notification category may differ from the first notification category in at least one parameter governing how notifications are generated and presented. For example, the second notification category may define a different communication channel (e.g., via email, text, dashboard, home page, pop-up, etc.) for presenting notifications, a different urgency level (e.g., higher or lower priority) associated with notification types, a different persistence or time duration (e.g., show once, show daily, show for a week, etc.) for presenting notifications, a different format (e.g., colored text, colored border, larger or smaller font size, with or without graphics, etc.) for presenting notifications, and/or a different requirement level (e.g., action required, action optional, etc.) for performing an action or workflow associated with the notification type.

The different second notification category may be identified by the notifications manager 150 using various techniques, including rules-based techniques as well as techniques that use machine learning models. For example, in a rules-based approach, the given notification type may be promoted to a second notification category that is higher priority if positive user interactions exceed the expected positive user interaction or a defined threshold (e.g., as indicated in the category definitions 152) for the first notification category (or conversely may be demoted to a second notification category that is lower priority if negative user interactions exceed the expected negative user interaction or a defined threshold for the first notification category). In some examples, a rules-based approach for re-categorizing notifications may have some level of tolerance built in (e.g., a hysteresis effect), so that the assigned notification category for the given notification type will not switch back and forth in rapid succession due to statistical fluctuations. In a particular example, the category may only be permitted to change once in a defined period such as, for example, where there were no prior changes in category for a given notification looking back over a trailing window of a defined time length. In another example, the notifications manager 150 may identify the second notification category as the notification category having an expected user interaction that is the closest match to the detected user interaction (e.g., using a statistical comparison of the detected user interaction with the expected user interaction for each category definition 152, or using a trained machine learning model to identify the notification category that best fits the detected user interaction).

In some examples, if the mismatch was identified for a specific communication channel, the given notification type may be assigned to a different second notification category based on a better match for the communication channel. For example, if notifications for the given notification type are provided via email and also via a status bar on the homepage, and the email notification gets more negative interactions from users than expected whereas the status bar notification receives the expected amount of positive/negative interactions (e.g., larger than expected majority of users dismisses email notification without action, but expected majority of users act on status bar notification), then the notification type may be assigned to a second notification category that excludes using email as a communication channel. In another example, the notification type may be assigned to different notification categories for different communication channels. For example, the notification type may be assigned to a lower priority notification category for notifications provided via email, and to a higher priority notification category for notifications provided via the status bar. Other such variations may be used, depending on the level of specificity at which the mismatch is identified.

In some examples, if the mismatch was identified for a particular user group (e.g., if a user group was identified at optional operation 312), the given notification type may be assigned to the different second notification category only for providing notifications for users belonging to that particular user group. Notifications may continue to be provided to other users (not belonging to that particular user group) in accordance with the first notification category.

In examples where the second notification category is identified for a specific user group and/or communication channel, the notification category 166 in the notification definition 160 may be updated to indicate the second notification category for that specific user group and/or communication channel, and further indicate the first notification category for other users not belonging to that specific user group and/or for communication channels other than that specific communication channel.

Optionally, in some examples, the notifications manager 150 may generate a record indicating the assigned second notification category for the given notification type. For example, the notifications manager 150 may log the identified mismatch and also log the assigned second notification category, to enable the applications developer 104 and/or administrator of the software platform 100 to understand how users are interacting with notifications on the software platform 100. In some examples, the record may be provided to an applications developer 104 as a recommendation, which may help to change how notifications are defined by the applications developer 104 for future and current software applications.

Optionally, in some examples, after identifying the second notification category for the given notification type, consent from the applications developer 104 may be requested before assigning the given notification type to the second notification category. For example, the notifications manager 150 may generate a request to the applications developer 104 indicating the given notification type, the identified mismatch and the recommended second notification category, with a request (e.g., selectable option) for the applications developer 104 to approve the assignment to the second notification category. The request may provide information about how assignment to the different second notification category will affect how notifications of the notification type will be provided (e.g., change to the communication channel, change to the action requirement level, change to the visual appearance, etc.).

At an operation 320, subsequent notifications for the given notification type are provided to a user (e.g., the same user to which the notification was provided at operation 302, or to a different user) according to the second notification category assigned at operation 318. Notifications may be generated and provided to users according to the defined parameters of the second notification type, as indicated in the category definitions 152, for example. In some examples, the notifications manage 150 may reformat subsequent notifications in accordance with the second notification type (e.g., if a specific format is indicated in the category definition 152 for the second notification type). Reformatting a notification may include, for example, changing a visual parameter (e.g., font size and/or color, add/remove color border, add/remove graphic, etc.) of the notification, add/hide/remove a selectable option (e.g., hide or remove an option to dismiss, if the notification type has been assigned to a high priority notification category where response to the notification is mandatory), among others.

If the second notification category was assigned only for providing notifications to a specific user group and/or communication channel, then notifications for the given notification type may continue to be provided according to the first notification category for other users and/or other communication channels.

Optionally, after a mismatch has been identified in some examples, a record may, additionally or alternatively, be generated by the notifications manager 150 indicating the identified mismatch. For example, the identified mismatch may be logged to enable the applications developer 104 or administrator of the software platform 100 to be able to track how users interact with notifications. The notifications manager 150 may, in some examples, inform the applications developer 104 of the identified mismatch. Such information may be useful to the applications developer 104 to help with development of future software applications and/or to improve a current software application. In some examples, the method 300 may end after the record indicating the identified mismatch has been generated. In some examples, operations of the method 300 following identification of the mismatch and generation of the record may be optional, or may be performed only after receiving confirmation from an administrator of the software platform 100.

Using the example method 300 described above, a notification type may be assigned to a more suitable notification category, in response to real-time user interactions. Further, the notification category may be dynamic and refined over time, in response to changing user interactions.

In some examples, there may be at least one notification category that prevents notification types of that notification category from being assigned to a different notification category. For example, the notification categories may include a "fixed" notification category that is indicated (e.g., according to the category definitions 152) as being excluded from automatic reassignment of categories. Notification types that have been assigned to the "fixed" notification category may not be automatically assigned to a different notification category by the notifications manager 150, and may be excluded from the method 300 described above.

In some examples, the notifications manager 150 may automatically assign a notification type to the second notification category for a group of users, based on the user interaction of a subset of users within that group of users. For example, if a service instance 110 is an online store, a user group may be associated with the online store (e.g., employees and employers of the online store). A subset of the user group (e.g., employers) may be considered superusers of the group. A superuser may be defined as a user in the group who has privileges and authorizations not given to other users of the group. In some examples, a superuser may have authorization to manage how notifications are categorized and/or generated for other (non-superuser) users of the group. When a given notification type is assigned to the second notification category based on the detected user interactions of the superusers, the given notification type may be assigned to the second notification category for all users belonging to the user group (regardless of or without detecting the interactions of other users in the user group).

In some examples, in addition to automatic assignment of a notification category by the notifications manager 150, a user may also manually assign notifications to a particular notification category. For example, a user home page may include options to configure which notification types are more important and which notification types are less important. The user may be able to override the automatically assigned notification category. In some examples if the user is a superuser of a user group, the superuser may manually configure the notification categorization for all users belonging to the user group.

Figure 4:
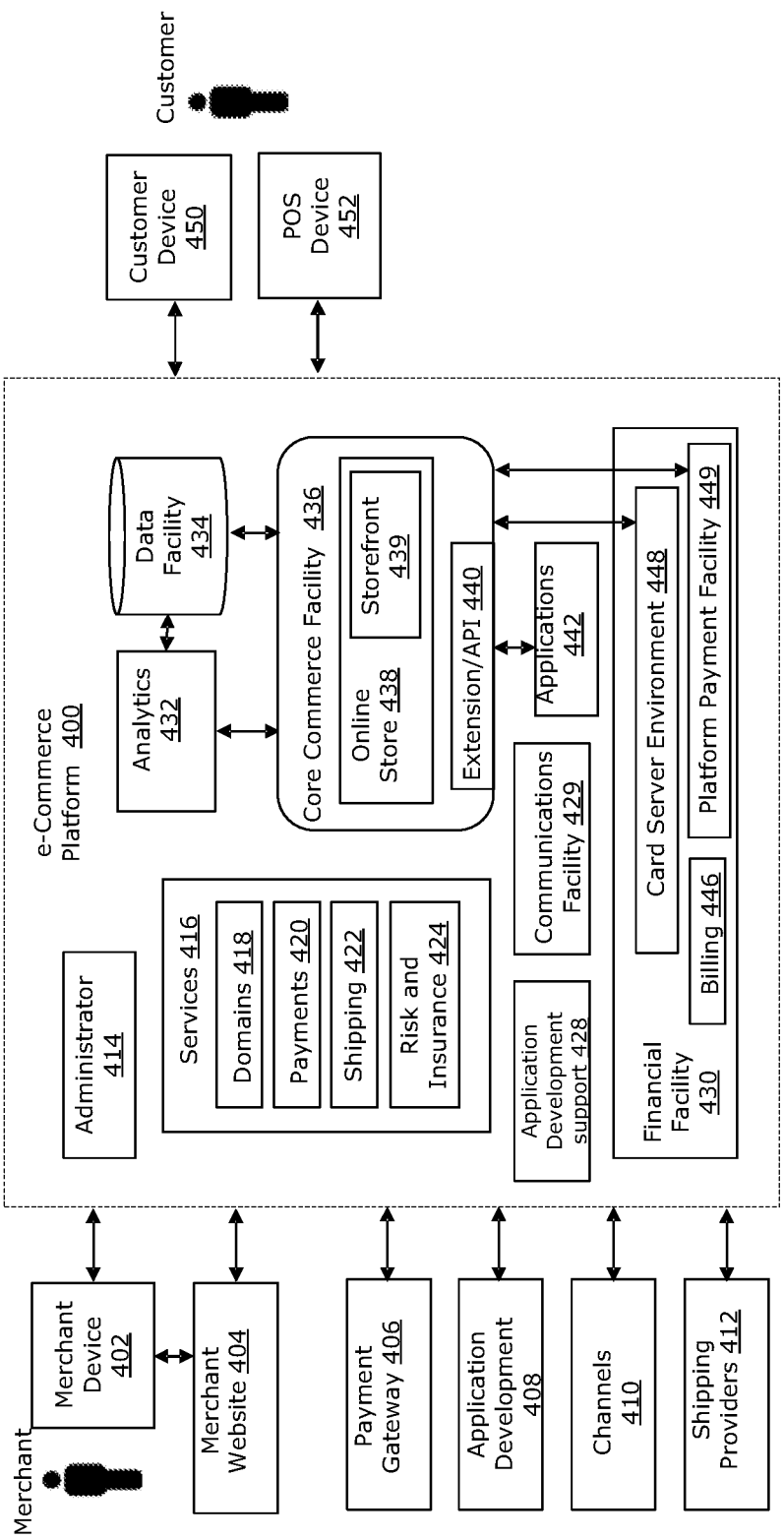
FIG. 4 is a block diagram of an example e-commerce platform, which may be a particular embodiment of the software platform of FIG. 1.

As previously mentioned, in some examples the software platform 100 may be an e-commerce platform. With reference to FIG. 4, an example embodiment of an e-commerce platform 400 is depicted. The e-commerce platform 400 may implement examples described herein. For example, the e-commerce platform 400 may, in addition to the components illustrated in FIG. 4, including the service instance(s) 110, the notifications manager 150, the notification definition(s) 160 and the applications register 170 of FIG. 1. The e-commerce platform 400 may enable merchants to provide products and services to customers. The e-commerce platform 400 may enable business-to-business (B2B) commercial transactions, for example between wholesale suppliers and retailers. The e-commerce platform 400 may also be referred to as a fulfillment platform and may be used to manage inventory over a network of physical warehouses.

In the context of the e-commerce platform 400, a user to whom a notification is generated (e.g., as discussed above) may also be referred to as a customer, a merchant, a supplier or a retailer, among other terminology. All references to customers, suppliers, retailers, and merchants should also be understood to be references to groups of individuals, companies, corporations, computing entities, and the like, and may represent for-profit or not-for-profit exchange of products. All references to users throughout this disclosure should also be understood to be non-specific to any role within a transaction. For example, a user may be a supplier-user (e.g., a B2B seller, wholesaler, or B2B provider of products), a retailer-user (e.g., a seller, retailer, or provider of products), or a customer-user (e.g., a buyer, purchase agent, or user of products), a prospective user (e.g., a user browsing and not yet committed to a purchase, a user evaluating the e-commerce platform 400 for potential use in marketing and selling products, and the like), a service provider user (e.g., a shipping provider 412, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Further, it should be understood that any individual or group of individuals may play more than one role and may fit more than one label in the e-commerce environment. For example, a corporate user may also be a customer.

The e-commerce platform 400 may provide a centralized system for providing merchants with online resources for managing their business. Merchants may utilize the e-commerce platform 400 for managing commerce with customers, such as by implementing an e-commerce experience with customers through an online store 438, through channels 410, through point of sale (POS) devices 452 in physical locations (e.g., a physical storefront or other location such as through a kiosk, terminal, reader, printer, 3D printer, and the like), by managing their business through the e-commerce platform 400, by interacting with customers through a communications facility 429 of the e-commerce platform 400, or any combination thereof. A merchant may sell products through both physical storefronts and the virtual storefront 439 of the online store 438.

The e-commerce platform 400 may also provide a centralized system for enabling B2B transactions between retailers and suppliers. Suppliers may, using a supplier device (not shown) for example, manage commerce with retailers in a manner similar to how retailers manage commerce with customers. For example, suppliers may manage an online store 438 that is accessible to retailers. For simplicity, the following discussion will be in the context of an online store 438 associated with a merchant, however it should be understood that the discussion may be applicable to both retailers and suppliers.

The online store 438 may represent a multitenant facility comprising a plurality of virtual storefronts 439. In various embodiments, merchants may manage one or more storefronts 439 in the online store 438, such as through a merchant device 402 (e.g., computer, laptop computer, mobile computing device, and the like), and offer products to customers through a number of different channels 410 (e.g., an online store 438; a physical storefront through a POS device 452; electronic marketplace, through an electronic buy button integrated into a website or social media channel such as on a social network, social media page, social media messaging system; and the like). A merchant may sell across channels 410 and then manage their sales through the e-commerce platform 400. A merchant may sell in their physical retail store, at pop ups, through wholesale, over the phone, and the like, and then manage their sales through the e-commerce platform 400. A merchant may employ all or any combination of these, such as maintaining a business through a physical storefront utilizing POS devices 452, maintaining a virtual storefront 439 through the online store 438, and utilizing the communications facility 429 to leverage customer interactions and analytics 432 to improve the probability of sales, for example.

In some examples, the term "merchant" may refer to a group of individuals who have different roles and responsibilities with respect to operation of the online store 138, and all such individuals may define a user group associated with the online store 138. The individuals associated with the online store 138 may have different hierarchies, for example an owner may have a higher hierarchy level than an employee, and the owner may be considered a "superuser" for the online store 138 (e.g., having certain privileges and authorization not given to other users associated with the online store 138).

In various embodiments, a customer may interact through a customer device 450 (e.g., computer, laptop computer, mobile computing device, and the like), a POS device 452 (e.g., retail device, a kiosk, an automated checkout system, and the like), or any other commerce interface device known in the art. The e-commerce platform 400 may enable merchants to reach customers through the online store 438, through POS devices 452 in physical locations (e.g., a merchant's storefront or elsewhere), to promote commerce with customers through dialog via electronic communication, and the like, providing a system for reaching customers and facilitating merchant services for the real or virtual pathways available for reaching and interacting with customers.

In various embodiments, the e-commerce platform 400 may be implemented through a processing facility including a processor and a memory, the processing facility storing a set of instructions that, when executed, cause the e-commerce platform 400 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 400, merchant devices 402, payment gateways 406, application development 408, channels 410, shipping providers 412, customer devices 450, POS devices 452, and the like. The e-commerce platform 400 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a thin client via a web browser, accessed through by POS devices 452, and the like). In various embodiments, elements of the e-commerce platform 400 may be implemented to operate on various platforms and operating systems, such as iOS, Android, over the internet, and the like.

In various embodiments, storefronts 439 may be served by the e-commerce platform 400 to customers (e.g., via customer devices 450), where customers can browse and purchase the various products available (e.g., add them to a cart, purchase immediately through a buy-button, and the like). Storefronts 439 may be served to customers in a transparent fashion without customers necessarily being aware that it is being provided through the e-commerce platform 400 (rather than directly from the merchant). Merchants may use a merchant configurable domain name, a customizable HTML theme, and the like, to customize their storefront 439. Merchants may customize the look and feel of their website through a theme system, such as where merchants can select and change the look and feel of their storefront 439 by changing their theme while having the same underlying product and business data shown within the storefront's product hierarchy. Themes may be further customized through a theme editor, a design interface that enables users to customize their website's design with flexibility.

Themes may also be customized using theme-specific settings that change aspects, such as specific colors, fonts, and pre-built layout schemes. The online store may implement a basic content management system for website content. Merchants may author blog posts or static pages and publish them to their storefront 439 and/or website 404, such as through blogs, articles, and the like, as well as configure navigation menus. Merchants may upload images (e.g., for products), video, content, data, and the like to the e-commerce platform 400, such as for storage by the system. In various embodiments, the e-commerce platform 400 may provide functions for resizing images, associating an image with a product, adding and associating text with an image, adding an image for a new product variant, protecting images, and the like.

As described herein, the e-commerce platform 400 may provide merchants with transactional facilities for products through a number of different channels 410, including the online store 438, over the telephone, as well as through physical POS devices 452 as described herein. The e-commerce platform 400 may provide business support services 416, an administrator component 414, and the like associated with running an on-line business, such as providing a domain service 418 associated with their online store, payments services 420 for facilitating transactions with a customer, shipping services 422 for providing customer shipping options for purchased products, risk and insurance services 424 associated with product protection and liability, merchant billing services 446, and the like. Services 416 may be provided via the e-commerce platform 400 or in association with external facilities, such as through a payment gateway 406 for payment processing, shipping providers 412 for expediting the shipment of products, and the like.

In various embodiments, the e-commerce platform 400 may provide for integrated shipping services 422 (e.g., through an e-commerce platform shipping facility or through a third-party shipping carrier), such as providing merchants with real-time updates, tracking, automatic rate calculation, bulk order preparation, label printing, and the like.

FIG. 5 depicts a non-limiting embodiment for a home page 470 of an administrator 414, which may show information about daily tasks, a store's recent activity, and the next steps a merchant can take to build their business. In various embodiments, a merchant may log in to administrator 414, such as from a browser or mobile device, and manage aspects of their storefront, such as viewing the storefront's recent activity, updating the storefront's catalog, managing orders, recent visits activity, total orders activity, and the like. In various embodiments, the merchant may be able to access the different sections of administrator 414 by using the sidebar 472, such as shown on FIG. 5. Sections of the administrator may include core aspects of a merchant's business, including orders, products, and customers; sales channels, including the online store, POS, and buy button; applications installed on the merchant's account; settings applied to a merchant's storefront 439 and account. A merchant may use a search bar 474 to find products, pages, or other information. Depending on the device the merchant is using, they may be enabled for different functionality through the administrator 414. For instance, if a merchant logs in to the administrator 414 from a browser, they may be able to manage all aspects of their storefront 439. If the merchant logs in from their mobile device, they may be able to view all or a subset of the aspects of their storefront 439, such as viewing the storefront's recent activity, updating the storefront's catalog, managing orders, and the like.

More detailed information about commerce and visitors to a merchant's storefront 439 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 410 from different periods of time (e.g., days, weeks, months, and the like), such as by using drop-down menus 476. An overview dashboard may be provided for a merchant that wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's storefront 439, such as based on account status, growth, recent customer activity, and the like. Notifications may be provided to assist a merchant with navigating through a process, such as capturing a payment, marking an order as fulfilled, archiving an order that is complete, and the like.

Figure 6:
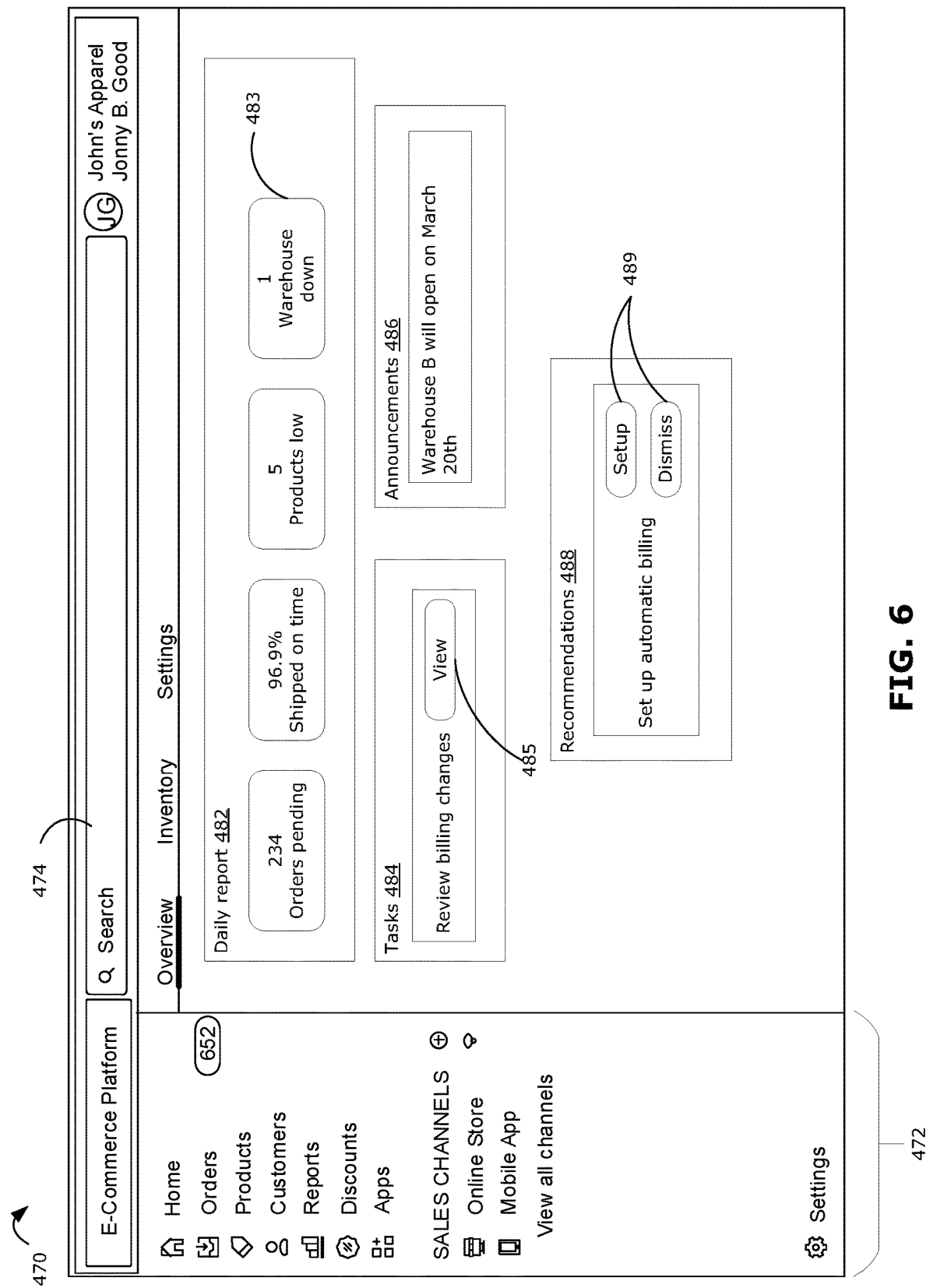
FIG. 6 is another example homepage of an administrator, which may be accessed via the e-commerce platform of FIG. 4.

FIG. 6 illustrates another example embodiment of the homepage 470, which may be presented to a merchant via the merchant device 402. The homepage 470 of FIG. 6 includes some aspects of the homepage 470 of FIG. 5. Further, the homepage 470 of FIG. 6 illustrates how notifications may be presented to a merchant. In particular, notifications may be presented according to the notification category to which the respective notification type has been assigned.

The homepage 470 includes a daily report 482, which presents notifications generated for notification types categorized as "information" (or "visibility"). Notification types assigned to the "information" notification category may be presented to provide the merchant with information about the day-to-day operation of the merchant's retail operations, for example to help the merchant identify customer orders that need attention. In this example, the daily report 482 includes a plurality of notifications 483, each of which relate to a different aspect of retail operations. Each notification 483 may be a selectable link that, when selected, navigates to a different page that is relevant to the context of that notification 483 (e.g., selecting "5 products low" may navigate to another page for managing inventory).

The homepage 470 also includes tasks 484, which presents notifications generated for notification types categorized as "required tasks". Notification types assigned to the "required tasks" notification category may be presented to inform the merchant that a required action is needed (e.g., required in order to complete fulfillment of a customer order). Such notifications may be considered high priority and not dismissable. In this example, each notification listed in tasks 484 includes a selectable option 485 to navigate to a different page that is relevant to the context of the notification. Such high priority notifications may be presented to a merchant via multiple communication channels (e.g., also sent via email, and in the context of a relevant page, in addition to being presented on the homepage 470).

The homepage 470 also includes announcements 486, which presents notifications generated for notification types categorized as "announcements". Notification types assigned to the "announcements" notification category may be presented to inform the merchant of general (e.g., platform-wide) information that the merchant does not necessarily need to act on (and hence may omit a selectable option in the notification). Such notifications may be considered low priority and may only be presented via one communication channel (e.g., only presented on the homepage 470).

The homepage 470 also includes recommendations 488, which presents notifications generated for notification types categorized as "recommendations" (or "insights"). Notification types assigned to the "recommendations" notification category may be presented to inform the merchant of actions that have been identified by the e-commerce platform 100 (e.g., using optimization algorithms performed by the analytics facility 432) as possible improvements to retail operations. Such notifications may include selectable options to implement the recommended option, or to dismiss the recommendation.

The merchant may configure the homepage 470 to display notifications for specific notification categories (e.g., by changing settings) and/or to change how notifications for different notification categories are presented. For example, a merchant may not want to view announcements 486 on the homepage 470, or may tasks 484 to be provided only via email.

Reference is made back to FIG. 4. The e-commerce platform may provide for a communications facility 429 and associated merchant interface for providing electronic communications and marketing, such as utilizing an electronic messaging aggregation facility (not shown) for collecting and analyzing communication interactions between merchants, customers, merchant devices 402, customer devices 450, POS devices 452, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 429 analyzes the interaction and provides analysis to the merchant on how to improve the probability for a sale.

The e-commerce platform 400 may provide a financial facility 430 for secure financial transactions with customers, such as through a secure card server environment 448. The e-commerce platform 400 may store credit card information, such as in payment card industry data (PCI) environments (e.g., a card server), to reconcile financials, bill merchants, perform automated clearing house (ACH) transfers between an e-commerce platform 400 financial institution account and a merchant's bank account (e.g., when using capital), and the like. These systems may have Sarbanes-Oxley Act (SOX) compliance and a high level of diligence required in their development and operation. The financial facility 430 may also provide merchants with financial support, such as through the lending of capital (e.g., lending funds, cash advances, and the like) and provision of insurance. In addition, the e-commerce platform 400 may provide for a set of marketing and partner services and control the relationship between the e-commerce platform 400 and partners. They also may connect and onboard new merchants with the e-commerce platform 400. These services may enable merchant growth by making it easier for merchants to work across the e-commerce platform 400. Through these services, merchants may be provided help facilities via the e-commerce platform 400.

In various embodiments, online store 438 may support a great number of independently administered storefronts 439 and process a large volume of transactional data on a daily basis for a variety of products. Transactional data may include customer contact information, billing information, shipping information, information on products purchased, information on services rendered, and any other information associated with business through the e-commerce platform 400. In various embodiments, the e-commerce platform 400 may store this data in a data facility 434. The transactional data may be processed to produce analytics 432, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 400 may store information about business and merchant transactions, and the data facility 434 may have many ways of enhancing, contributing, refining, and extracting data, where over time the collected data may enable improvements to aspects of the e-commerce platform 400.

In various embodiments, the e-commerce platform 400 may be configured with a core commerce facility 436 for content management and task automation to enable support and services to the plurality of storefronts 439 (e.g., related to products, inventory, customers, orders, collaboration, suppliers, reports, financials, risk and fraud, and the like), but be extensible through applications 442 that enable greater flexibility and custom processes required for accommodating an ever-growing variety of merchant storefronts 439, POS devices 452, products, and services. For instance, the core commerce facility 436 may be configured for flexibility and scalability through portioning (e.g., sharding) of functions and data, such as by customer identifier, order identifier, storefront identifier, and the like. The core commerce facility 436 may accommodate store-specific business logic and a web administrator. The online store 438 may represent a channel, be embedded within the core commerce facility 436, provide a set of support and debug tools that support uses for merchants, and the like. The core commerce facility 436 may provide centralized management of critical data for storefronts 439.

The core commerce facility 436 includes base or "core" functions of the e-commerce platform 400, and as such, as described herein, not all functions supporting storefronts 439 may be appropriate for inclusion. For instance, functions for inclusion into the core commerce facility 436 may need to exceed a core functionality threshold through which it may be determined that the function is core to a commerce experience (e.g., common to a majority of storefront activity, such as across channels, administrator interfaces, merchant locations, industries, product types, and the like), is re-usable across storefronts (e.g., functions that can be re-used/modified across core functions), limited to the context of a single storefront at a time (e.g., implementing a storefront "isolation principle", where code should not be able to interact with multiple storefronts at a time, ensuring that storefronts cannot access each other's data), provide a transactional workload, and the like. Maintaining control of what functions are implemented may enable the core commerce facility 436 to remain responsive, as many required features are either served directly by the core commerce facility 436 or enabled by its extension/application programming interface (API) 440 connection to applications 442. If care is not given to restricting functionality in the core commerce facility 436, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the core commerce facility 436 may be configured to maintain responsiveness, such as through configuration that utilizes timeouts, queues, backpressure to prevent degradation, and the like.

Although isolating storefront data is important to maintaining data privacy between storefronts 439 and merchants, there may be reasons for collecting and using cross-store data, such as for example, with an order risk assessment system or a platform payment facility, both of which require information from a majority of storefronts 439 to perform well. In various embodiments, rather than violating the isolation principle, it may be preferred to move these components out of the core commerce facility 436 and into their own infrastructure within the e-commerce platform 400. For example, the data facility 434 and analytics 432 may be located outside the core commerce facility 436.

In various embodiments, the e-commerce platform 400 may provide for a platform payment facility 449, which is another example of a component that utilizes data from the core commerce facility 438 but may be located outside so as to not violate the isolation principle. The platform payment facility 449 may allow customers interacting with storefronts 439 to have their payment information stored safely by the core commerce facility 436 such that they only have to enter it once. When a customer visits a different storefront 439, even if they've never been there before, the platform payment facility 449 may recall their information to enable a more rapid and correct check out. This may provide a cross-platform network effect, where the e-commerce platform 400 becomes more useful to its merchants as more merchants join, such as because there are more customers who checkout more often because of the ease of use with respect to customer purchases. To maximize the effect of this network, payment information for a given customer may be retrievable from a storefront's checkout, allowing information to be made available globally across storefronts 439. It would be difficult and error prone for each storefront 439 to be able to connect to any other storefront 439 to directly retrieve the payment information stored there. As a result, the platform payment facility 449 may be implemented external to the core commerce facility 436.

For those functions that are not included within the core commerce facility 438, applications 442 provide a way to add features to the e-commerce platform 400. Applications 442 may be able to access and modify data on a merchant's storefront 439, perform tasks through the administrator 414, create new flows for a merchant through a user interface (e.g., that is surfaced through extensions/API 440), and the like. Merchants may be enabled to discover and install applications 442 through application searching 508 and application recommendations 510 (see FIG. 7). In various embodiments, core products, core extension points, applications, and the administrator 414 may be developed to work together. For instance, application extension points may be built inside the administrator 414 so that core features may be extended by way of applications 442, which may deliver functionality to a merchant through the extension/API 440.

In various embodiments, applications 442 may deliver functionality to a merchant through the extension/API 440, such as where an application 442 is able to surface transaction data to a merchant (e.g., App: "Surface my app in mobile and web admin using the embedded app SDK"), and/or where the core commerce facility 436 is able to ask the application to perform work on demand (core: "App, give me a local tax calculation for this checkout").

Applications 442 may support storefronts 439 and channels 410, provide merchant support, integrate with other services, and the like. Where the core commerce facility 436 may provide the foundation of services to the storefront 439, the applications 442 may provide a way for merchants to satisfy specific and sometimes unique needs. Different merchants will have different needs, and so may benefit from different applications 442. Applications 442 may be better discovered through the e-commerce platform 400 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 442 may be connected to the core commerce facility 436 through an extension/API layer 440, such as utilizing APIs to expose the functionality and data available through and within the core commerce facility 436 to the functionality of applications (e.g., through REST, GraphQL, and the like). For instance, the e-commerce platform 400 may provide API interfaces to merchant and partner-facing products and services, such as may include, for example, application extensions, process flow services, developer-facing resources, and the like. With customers more frequently using mobile devices for shopping, applications 442 related to mobile use may benefit from more extensive use of APIs to support the related growing commerce traffic. The flexibility offered through use of applications and APIs (e.g., as offered for application development) enable the e-commerce platform 400 to better accommodate new and unique needs of merchants (and internal developers through internal APIs) without requiring constant change to the core commerce facility 436, thus providing merchants what they need when they need it. For instance, shipping services 422 may be integrated with the core commerce facility 436 through a shipping or carrier service API, thus enabling the e-commerce platform 400 to provide shipping service functionality without directly impacting code running in the core commerce facility 436.

Many merchant problems may be solved by letting partners (e.g., third-party service providers) improve and extend merchant workflows through application development, such as problems associated with back-office operations (merchant-facing applications) and in the storefront (customer-facing applications). As a part of doing business, many merchants will use mobile and web related applications on a daily basis for back-office tasks (e.g., merchandising, inventory, discounts, fulfillment, and the like) and storefront tasks (e.g., applications related to their online shop, for flash-sales, new product offerings, and the like), where applications 442, through extension/API 440, help make products easy to view and purchase in a fast growing marketplace. In various embodiments, partners, application developers, internal applications facilities, and the like, may be provided with a software development kit (SDK), such as through creating a frame within the administrator 414 that sandboxes an application interface. In various embodiments, the administrator 414 may not have control over nor be aware of what happens within the frame. The SDK may be used in conjunction with a user interface kit to produce interfaces that mimic the look and feel of the e-commerce platform 400, such as acting as an extension of the core commerce facility 436.

Applications 442 that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the core commerce facility 436, such as for synchronizing a local database, notifying an external integration partner, and the like. Update events may enable this functionality without having to poll the core commerce facility 436 all the time to check for updates, such as through an update event subscription. In various embodiments, when a change related to an update event subscription occurs, the core commerce facility 436 may post a request, such as to a predefined callback URL. The body of this request may contain a new state of the object and a description of the action or event. Update event subscriptions may be created manually, in the administrator facility 414, or automatically (e.g., via the API). In various embodiments, update events may be queued and processed asynchronously from a state change that triggered them, which may produce an update event notification that is not distributed in real-time.

Figure 7:
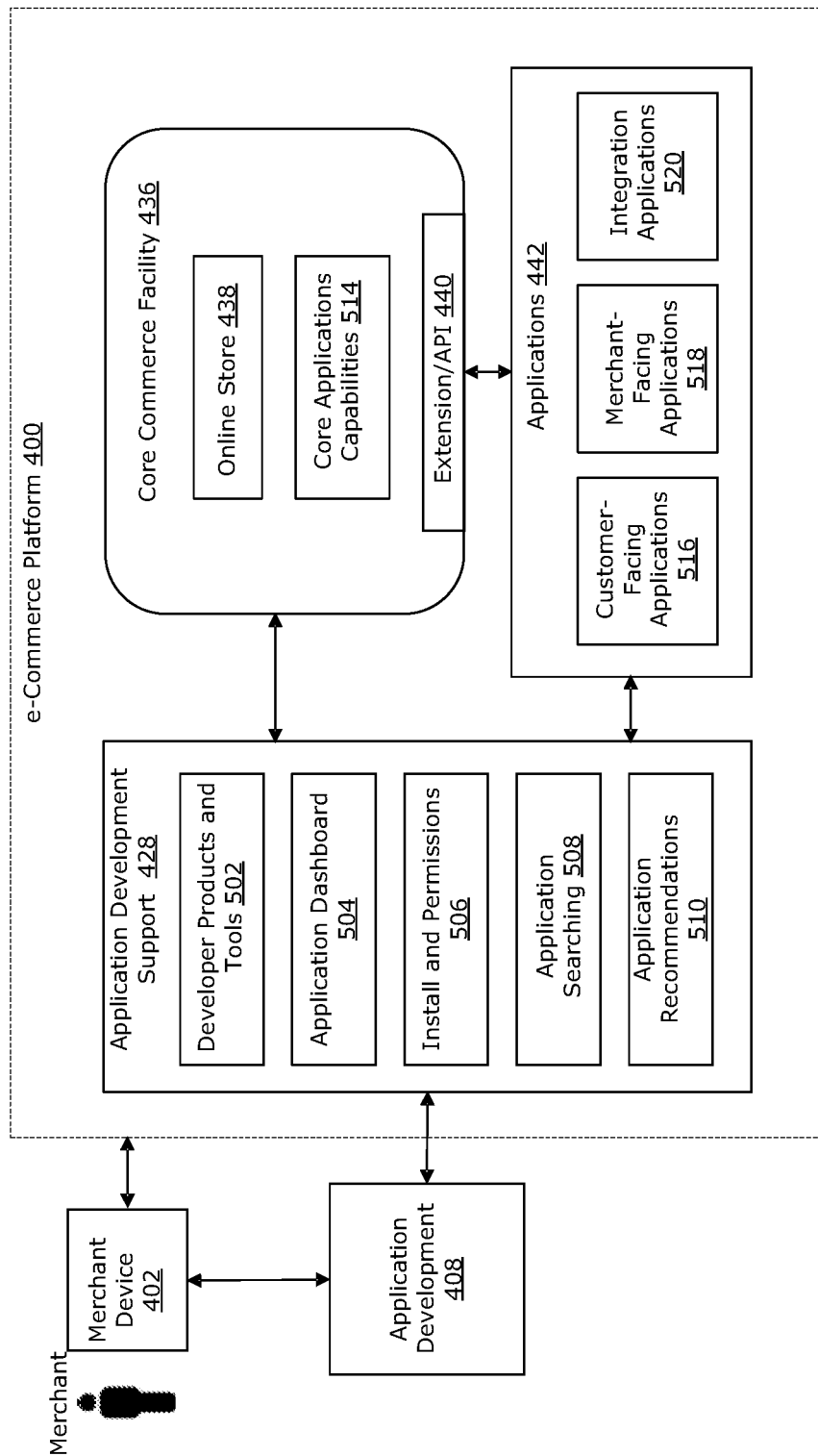
FIG. 7 is another block diagram of the e-commerce platform of FIG. 4, showing some details related to application development.

Reference is made to FIG. 7, which is another depiction of the e-commerce platform 400. FIG. 7 omits some details that have been described with reference to FIG. 4, and shows further details discussed below. In various embodiments, the e-commerce platform 400 may provide application development support 428. Application development support 428 may include developer products and tools 502 to aid in the development of applications, an application dashboard 504 (e.g., to provide developers with a development interface, to administrators for management of applications, to merchants for customization of applications, and the like), facilities for installing and providing permissions 506 with respect to providing access to an application 442 (e.g., for public access, such as where criteria must be met before being installed, or for private use by a merchant), application searching 508 to make it easy for a merchant to search for applications 442 that satisfy a need for their storefront 439, application recommendations 510 to provide merchants with suggestions on how they can improve the user experience through their storefront 439, a description of core application capabilities 514 within the core commerce facility 436, and the like. These support facilities may be utilized by application development 408 performed by any entity, including the merchant developing their own application 442, a third-party developer developing an application 442 (e.g., contracted by a merchant, developed on their own to offer to the public, contracted for use in association with the e-commerce platform 400, and the like), or an application being developed by internal personal resources associated with the e-commerce platform 400. In various embodiments, applications 442 may be assigned an application identifier (ID), such as for linking to an application (e.g., through an API), searching for an application, making application recommendations, and the like.

The core commerce facility 436 may include base functions of the e-commerce platform 400 and expose these functions through APIs to applications 442. The APIs may enable different types of applications built through application development 408. Applications 442 may be capable of satisfying a great variety of needs for merchants but may be grouped roughly into three categories: customer-facing applications 516, merchant-facing applications 518, or integration applications 520. Customer-facing applications 516 may include storefront 439 or channels 410 that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 518 may include applications that allow the merchant to administer their storefront 439 (e.g., through applications related to the web or website or to mobile devices), run their business (e.g., through applications related to POS devices 452), to grow their business (e.g., through applications related to shipping (e.g., drop shipping), use of automated agents, use of process flow development and improvements), and the like. Integration applications 520 may include applications that provide useful integrations that participate in the running of a business, such as shipping providers 412 and payment gateways.

In various embodiments, an application developer may use an application proxy to fetch data from an outside location and display it on the page of an online storefront 439. Content on these proxy pages may be dynamic, capable of being updated, and the like. Application proxies may be useful for displaying image galleries, statistics, custom forms, and other kinds of dynamic content. The core-application structure of the e-commerce platform 400 may allow for an increasing number of merchant experiences to be built in applications 442 so that the core commerce facility 436 can remain focused on the more commonly utilized business logic of commerce.

The e-commerce platform 400 provides an online shopping experience through a curated system architecture that enables merchants to connect with customers in a flexible and transparent manner. A typical customer experience may be better understood through an embodiment example purchase workflow, where the customer browses the merchant's products on a channel 410, adds what they intend to buy to their cart, proceeds to checkout, and pays for the content of their cart resulting in the creation of an order for the merchant. The merchant may then view and fulfill (or cancel) the order. The product is then delivered to the customer. If the customer is not satisfied, they might return the products to the merchant.

In an example embodiment, a customer may browse a merchant's products on a channel 410. Channels 410 are places where customers can view and buy products, such as the online store 138, on a social media platform, or a third-party application external to the e-commerce platform 400, among other possibilities. In various embodiments, channels 410 may be modeled as applications 442 (a possible exception being the online store 138, which is integrated within the core commence facility 436). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In various embodiments, the customer may add what they intend to buy to their virtual shopping cart (in an alternate embodiment, a product may be purchased directly, such as through a buy button as described herein). Customers may add product variants to their shopping cart. The shopping cart model may be channel specific. The online store 438 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 400 may provide an opportunity to re-engage the customer (e.g., via an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., "secret" strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 410 may use the core commerce facility 436 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 406 may be provided through the card server environment 448. In various embodiments, the payment gateway 406 may accept international payment, such as integrating with leading international credit card processors. The card server environment 448 may include a card server application, card sink, hosted fields, and the like. This environment may act as the secure gatekeeper of the sensitive credit card information.

Figure 8:
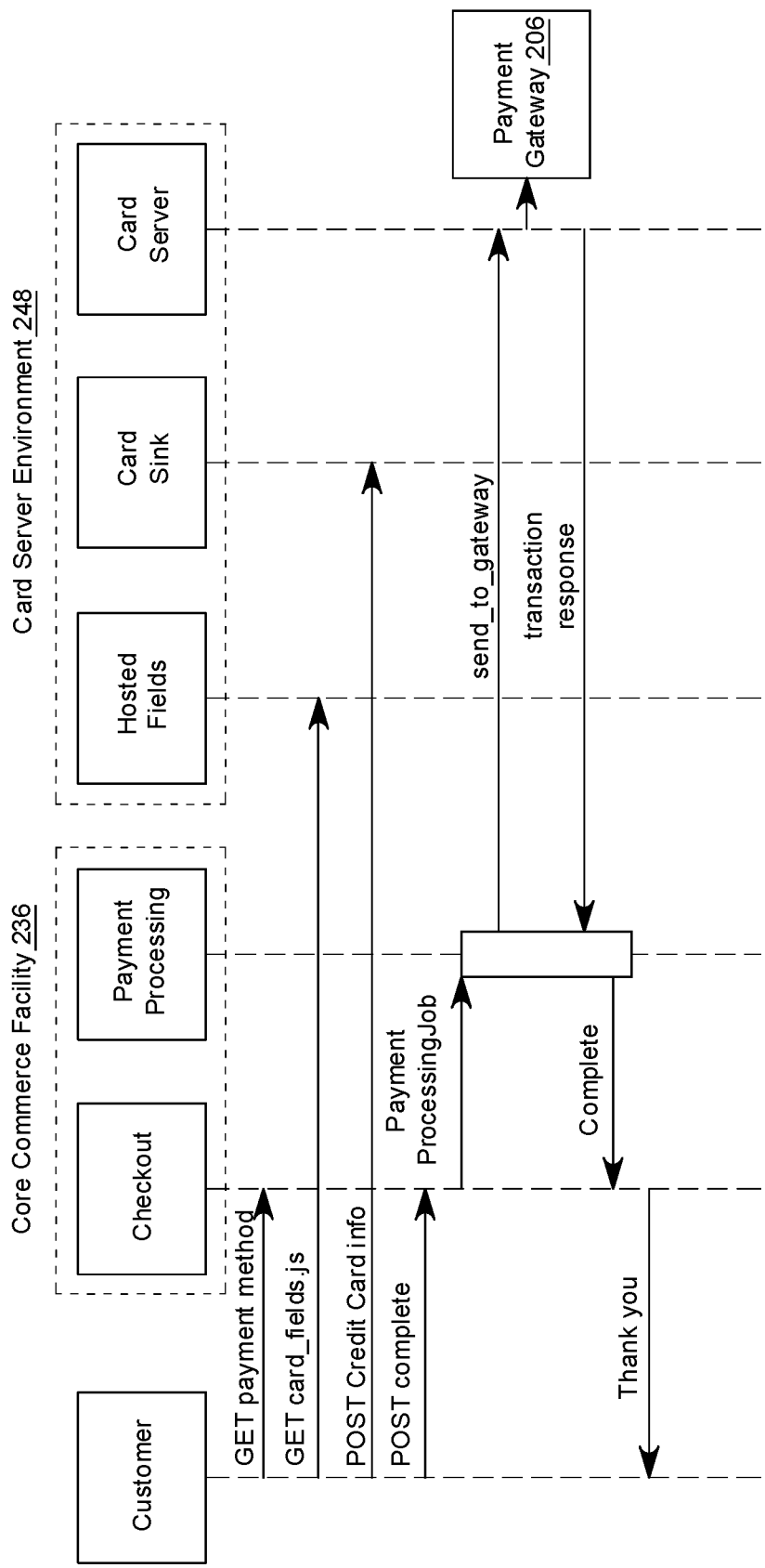
FIG. 8 shows an example data flow that may take place when a purchase is made using the e-commerce platform of FIG. 4.

FIG. 8 presents, in a non-limiting example, a simplified sequence diagram of the interactions between the core commerce facility 436 and the card server environment 448 during payment processing of a credit, prepaid, gift or other card on a Web Checkout.

In various embodiments, most of the process may be orchestrated by a payment processing job. The core commerce facility 436 may support many other payment methods, such as through an offsite payment gateway 406 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 410 that do not rely on core commerce facility checkouts may use an order API to create orders. Once an order is created, an order confirmation notification may be sent to the customer and an order placed notification sent to the merchant via a notifications component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as tailored towards impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor). The merchant may then view and fulfill (or cancel) the order.

An order assessment component may implement a business process merchants use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In various embodiments, this business process may be implemented by a fulfillment component. The fulfillment component may group the line items of the order into a logical fulfillment unit of work based on an inventory location and fulfillment service. The merchant may assess the order, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third party, where the third-party application creates a fulfillment record. A legacy fulfillment service may trigger a custom API call from the core commerce facility 436 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a returns component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that were not returned and remain in the customer's hands); and the like. A return may represent a change to the contract of sale (e.g., the order), and where the e-commerce platform 400 may make the merchant aware of compliance issues with respect to legal obligations (e.g., with respect to taxes). In various embodiments, the e-commerce platform 400 may enable merchants to keep track of changes to the contract of sales over time, such as implemented through a sales model component (e.g., an append-only date-based ledger that records sale-related events that happened to an item).

Although the above discussion relates to fulfillment of a customer order by a merchant, a similar process may be involved for fulfillment of a merchant order by a supplier. For example, a merchant may similarly shop for products on a supplier's storefront 439 and complete a similar checkout process to pay for the order.

In various examples, the present disclosure describes methods and systems that enable a software platform to automatically assign a given notification type to a particular notification category, based on how users have interacted with notifications of the given notification type. The software platform thus can enable subsequent notifications for the given notification type to be presented to users in a more effective and user-friendly manner, and may reduce the load on the platform's processing resources and memory resources (e.g., by reducing the generation of unnecessary notifications, reducing the use of bandwidth on communication channels, etc.).

Using examples disclosed herein, a given notification type can be assigned to a notification category by the software platform, without having to engage with a third-party applications developer. The developer does not have to make any programming changes to the application that is generating the notifications of the notification type. The developer may not need to be informed that the given notification type is being re-categorized.

In some examples, notifications generated for a given notification type may be assigned to different notification categories depending on different user groups. The user interaction, analyzed over the user group, may be used to assign a notification category that governs how notifications of the given notification type will be generated for other users of the user group (who may not have previously received notifications of the given notification type). In this way, the present disclosure enables user behavior of representative users to be leveraged to improve the resource usage and user experience for all users in the user group.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A system comprising:
    a processor in communication with storage, the processor configured to execute instructions from the storage to cause the system to:
        provide, to a first user account, a notification of a given notification type according to a first priority category to which the given notification type is assigned, the given notification type defining a template for generating the notification, and the first priority category defining a first priority for the given notification type and a first manner in which the notification is provided;
        detect a user interaction associated with the notification, the detected user interaction being associated with the first user account;
        compute, using at least the detected user interaction associated with the first user account, a detected user interaction rate for the given notification type;
        identify a mismatch between the detected user interaction rate and a first expected user interaction rate associated with the assigned first priority category;
        in response to identifying the mismatch, assign the given notification type to a second priority category that is associated with a second expected user interaction rate that is closer to the detected user interaction rate than the first expected user interaction rate, the second priority category defining a second, different priority for the given notification type and a second, different manner for providing a subsequent notification of the given notification type, wherein when the detected user interaction rate is lower than the expected user interaction rate associated with the assigned first priority category the given notification type is assigned to the second priority category that defines a lower priority than the first priority; and
        provide the subsequent notification of the given notification type to a second user account according to the second priority category.

2. The system of claim 1, wherein the first priority category and the second priority category each defines, in addition to the respective first priority and second priority, one or more parameters for generating the notification, and wherein the second priority category defines at least one parameter for generating the subsequent notification that is different from the one or more parameters defined by the first priority category.

3. The system of claim 2, wherein the one or more parameters defined by the first or the second priority category include one or more of:
    a communication channel for presenting notifications of the given notification type;
    an urgency level associated with the given notification type;
    a format for presenting notifications of the given notification type;
    a time duration associated with notifications of the given notification type; or
    a requirement level for performing a workflow associated with the given notification type.

4. The system of claim 1, wherein the detected user interaction is one or more of:
    a user-activated workflow associated with the given notification type;
    an option selection presented by the notification;
    a notification view event;
    an absence of a response event; or
    a notification dismiss event.

5. The system of claim 4, wherein the detected user interaction includes the user-activated workflow associated with the given notification type, the processor being configured to execute instructions from the storage to cause the system to:
    collect data associated with at least the first user account for a time duration subsequent to execution of the user-activated workflow; and determine, from the collected data, a success metric associated with execution of the user-activated workflow;

wherein the success metric is applied as a weighting factor to the detected user interaction rate, and wherein the mismatch is identified using the detected user interaction rate after weighting by the success metric.

6. The system of claim 1, wherein the first user account is associated with a user group, wherein the detected user interaction is associated with the user group, and wherein the given notification type is assigned to the second priority category for the user group, the processor being configured to execute instructions from the storage to cause the system to:

generate, for the second user account belonging to the user group, the subsequent notification according to the second priority category.

7. The system of claim 6, wherein the user group is defined by one or more of:

association with a service instance associated with the first user account;
status associated with the first user account;
hierarchy level associated with the first user account; or
one or more user characteristics associated with the first user account.

8. The system of claim 1, wherein the first user account is associated with a user group, wherein the detected user interaction is associated with the user group, and wherein the given notification type is assigned to the second priority category for the user group, the processor being configured to execute instructions from the storage to cause the system to:

generate, for a third user account excluded from the user group, a different subsequent notification according to the first priority category.

9. The system of claim 1, wherein the first user account is a superuser associated with a user group, and wherein the notification is assigned to the second priority category for other user accounts associated with the user group based on the detected user interaction associated with the superuser.

10. A method for generating notifications, the method comprising:

providing, to a first user account, a notification of a given notification type according to a first priority category to which the given notification type is assigned, the given notification type defining a template for generating the notification, and the first priority category defining a first priority for the given notification type and a first manner in which the notification is provided;

detecting a user interaction associated with the notification, the detected user interaction being associated with the first user account;

compute, using at least the detected user interaction associated with the first user account, a detected user interaction rate for the given notification type;

identifying a mismatch between the detected user interaction rate and a first expected user interaction rate associated with the assigned first priority category;

in response to identifying the mismatch, assigning the given notification type to a second priority category that is associated with a second expected user interaction rate that is closer to the detected user interaction rate than the first expected user interaction rate, the second priority category defining a second, different priority for the given notification type and a second, different manner for providing a subsequent notification of the given notification type; and providing the subsequent notification of the given notification type to a second user account according to the second priority category.

11. The method of claim 10, wherein the first priority category and the second priority category each defines, in addition to the respective first priority and second priority, one or more parameters for generating the notification, and wherein the second priority category defines at least one parameter for generating the subsequent notification that is different from the one or more parameters defined by the first priority category.

12. The method of claim 11, wherein the one or more parameters defined by the first or the second priority category include one or more of:

a communication channel for presenting notifications of the given notification type;
an urgency level associated with the given notification type;
a format for presenting notifications of the given notification type;
a time duration associated with notifications of the given notification type; or
a requirement level for performing a workflow associated with the given notification type.

13. The method of claim 10, wherein the detected user interaction is one or more of:

a user-activated workflow associated with the given notification type;
an option selection presented by the notification;
a notification view event;
an absence of a response event; or
a notification dismiss event.

14. The method of claim 13, wherein the detected user interaction includes the user-activated workflow associated with the given notification type, the method further comprising:

collecting data associated with at least the first user account for a time duration subsequent to execution of the user-activated workflow; and determining, from the collected data, a success metric associated with execution of the user-activated workflow;

wherein the success metric is applied as a weighting factor to the detected user interaction rate, and wherein the mismatch is identified using the detected user interaction rate after weighting by the success metric.

15. The method of claim 10, wherein the first user account is associated with a user group, wherein the detected user interaction is associated with the user group, and wherein the given notification type is assigned to the second priority category for the user group, the method further comprising:

generating, for the second user account belonging to the user group, the subsequent notification according to the second priority category.

16. The method of claim 15, wherein the user group is defined by one or more of:

association with a service instance associated with the first user account;
status associated with the first user account;
hierarchy level associated with the first user account; or
one or more user characteristics associated with the first user account.

17. The method of claim 10, wherein the first user account is associated with a user group, wherein the detected user interaction is associated with the user group, and wherein the given notification type is assigned to the second priority category for the user group, the method further comprising:

generate, for a third user account excluded from the user group, a different subsequent notification according to the first priority category.

18. The method of claim 10, wherein the first user account is a superuser associated with a user group, and wherein the notification is assigned to the second priority category for other user accounts associated with the user group based on the detected user interaction associated with the superuser.

19. A non-transitory computer-readable medium storing instructions that, when executed by a processor of a system, cause the system to:
provide, to a first user account, a notification of a given notification type according to a first priority category to which the given notification type is assigned, the given notification type defining a template for generating the notification, and the first priority category defining a first priority for the given notification type and a first manner in which the notification is provided;
detect a user interaction associated with the notification, the detected user interaction being associated with the first user account;
compute, using at least the detected user interaction associated with the first user account, a detected user interaction rate for the given notification type;
identify a mismatch between the detected user interaction rate and a first expected user interaction rate associated with the assigned first priority category;
in response to identifying the mismatch, assign the given notification type to a second priority category that is associated with a second expected user interaction rate that is closer to the detected user interaction rate than the first expected user interaction rate, the second priority category defining a second, different priority for the given notification type and a second, different manner for providing a subsequent notification of the given notification type, wherein when the detected user interaction rate is lower than the expected user interaction rate associated with the assigned first priority category the given notification type is assigned to the second priority category that defines a lower priority than the first priority; and
provide the subsequent notification of the given notification type to a second user account according to the second priority category.

20. The non-transitory computer-readable medium of claim 19, wherein the first user account is associated with a user group, wherein the detected user interaction is associated with the user group, and wherein the notification type is assigned to the second priority category for the user group, the instructions further causing the system to:
generate, for the second user account belonging to the user group, the subsequent notification according to the second notification priority category.

* * * * *